United States Patent [19]
Moskovich

[11] Patent Number: 5,296,967
[45] Date of Patent: Mar. 22, 1994

[54] HIGH SPEED WIDE ANGLE PROJECTION TV LENS SYSTEM

[75] Inventor: Jacob Moskovich, Cincinnati, Ohio

[73] Assignee: U.S. Precision Lens Incorporated, Cincinnati, Ohio

[21] Appl. No.: 844,160

[22] Filed: Mar. 2, 1992

[51] Int. Cl.⁵ .............................................. G02B 13/18
[52] U.S. Cl. ................................... 359/649; 359/708; 359/713
[58] Field of Search .............. 359/649, 650, 651, 708, 359/713, 714

[56] References Cited

U.S. PATENT DOCUMENTS

| | | | |
|---|---|---|---|
| 4,300,817 | 11/1981 | Betensky | 359/651 |
| 4,348,081 | 9/1982 | Betensky | 359/651 |
| 4,526,442 | 7/1985 | Betensky | 359/651 |
| 4,682,862 | 7/1987 | Moskovich | 359/649 |
| 4,697,892 | 10/1987 | Betensky | 359/650 |
| 4,755,028 | 7/1988 | Moskovich | 359/650 |
| 4,776,681 | 10/1988 | Moskovich | 359/649 |

OTHER PUBLICATIONS

Dunham, C. B., and C. R. Crawford, "Minimax Approximation by a Semi-Circle," *Society for Industrial and Applied Mathematics*, vol. 17, No. 1, Feb., 1980.

*Primary Examiner*—Scott J. Sugarman
*Attorney, Agent, or Firm*—Maurice M. Klee

[57] ABSTRACT

Projection lens systems for use in projection televisions are provided. The lens systems include a strong positive element which provides a majority of the power of the lens, a strong negative unit which provides most of the correction for the field curvature of the lens system, and four weak meniscus aspherical elements, two on each side of the positive element. By means of this arrangement, the lens system achieves a semi-field of view of approximately 40° at a f-number of about 1.0 or less. The lens systems are used to minimize the size of projection television sets since their semi-field of view of approximately 40° substantially matches the maximum numerical aperture of about 0.65 of projection screens used in such sets.

14 Claims, 4 Drawing Sheets

HIGH SPEED WIDE ANGLE PROJECTION TV LENS SYSTEM

BACKGROUND OF THE INVENTION

1. Field of the Invention

This invention relates to projection lens systems for use in projection televisions and, in particular, to improved projection lens systems having both a wide field of view, e.g., a semi-field of view on the order of about 40°, and a low f-number, e.g., a f-number on the order of about 1.0 or less.

2. Description of the Prior Art

Projection lens systems for CRT projection televisions have undergone continuing development during the past fifteen years or so. As a result, many of today's CRT projection televisions are equipped with fast lens systems having f-numbers of f/1 and smaller and provide semi-fields of view of 25° and wider.

As is well-known, color images are obtained for television systems of this type by combining images from three color CRTs, i.e., a red CRT, a green CRT, and a blue CRT. Since the emission spectra of the CRTs are relatively narrow, for consumer applications, lens systems uncorrected for color can often be used.

When the field of view does not exceed a half-angle of about 25°, the lens system may consist of just three components and still provide a sufficiently high level of image quality. A typical configuration has a weak aspherical element on the image side of the lens system, followed by a strong positive power element, followed in turn by a strong negative element in close proximity to the CRT. See, for example, Betensky, U.S. Pat. Nos. 4,300,817, 4,348,081, and 4,526,442.

For this configuration, the aspherical first element provides most of the correction of spherical aberration and other aperture dependent aberrations, the positive element in combination with the relative position of the aperture stop of the lens system allows for the astigmatism to be corrected, and the negative element close to CRT provides correction for the field curvature of the lens.

When the focal length of the lens system is shortened to make the projection television more compact, the field coverage of the lens system must be increased. When the half-angle of view is increased to about 28°, a three element form generally cannot provide an appropriately high level of optical performance. To address this problem, a fourth element (corrector element) has been added between the strong positive and the strong negative elements of the three component configuration. See Betensky, U.S. Pat. No. 4,697,892, and Moskovich, U.S. Pat. Nos. 4,682,862, 4,755,028, and 4,776,681. This additional element usually does not have much optical power; however, it must have an aspherical surface to correct for aperture dependent off-axis aberrations like sagittal oblique spherical and coma. Four element configurations have been used effectively up to half-angles of 33° to 35°. Five element configurations are also known in the art. See the Moskovich '862 and '681 patents, supra.

One of the most widely used CRT projection television configurations is the rear projection TV. In this configuration, the CRT image is projected onto the back side of a diffuse screen which is viewed from its front side by the TV audience. To make the image bright and evenly illuminated, most projection screens have employed fresnel lenses and lenticular lenslet arrays. As a result, these screens have typically had a numerical aperture of about 0.57, corresponding to a maximum half field of view of the lens system of about 35°. Improvements in screen manufacturing technology have allowed the maximum numerical aperture to be increased to about 0.65 corresponding to a maximum half field of view of the lens system of about 40°. This increased field of view should allow for significant reduction in the size of projection TV sets. However, it has been found that the four and five element projection lens system configurations described above do not in general provide sufficiently high image quality when used at semi-field angles of 40°.

SUMMARY OF THE INVENTION

In view of the foregoing state of the art, it is an object of the present invention to provide improved projection lens systems for use in projection televisions and, in particular, in rear projection televisions.

More particularly, it is an object of the invention to provide projection lens systems capable of covering a semi-field of view of up to about 40° at a f-number on the order of 1.0 or less, while at the same time providing an image quality which is sufficiently high to satisfy the requirements of modern consumer projection TV systems. Further, it is an object of the invention to provide projection lens systems having the foregoing properties which can be manufactured at a reasonable cost.

To achieve the foregoing and other objects, the invention provides a projection lens system for use in combination with a cathode ray tube comprising from the image side, a weak meniscus aspherical element convex to the image side, a weak meniscus aspherical element concave to the image side, a strong positive element providing a majority of the power of the lens, a weak aspherical meniscus element concave to the cathode ray tube, a weak aspherical meniscus element convex to the cathode ray tube, and a strong negative unit positioned close to the cathode ray tube and providing most of the correction for the field curvature of the lens.

As used herein, the term "weak" is used to describe an element whose focal length has a magnitude which is at least about 2.0 times the effective focal length of the entire lens system, and the term "strong" is used to describe an element or unit whose focal length has a magnitude which is less than about 1.5 times the effective focal length of the entire lens system.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the lens systems of the present invention include six components arranged in the following order from the lens system's long conjugate to its short conjugate, i.e., from the screen to the CRT: a weak meniscus element convex toward the long conjugate, another weak meniscus element convex toward the short conjugate, a strong positive element providing most of the power of the lens, a weak meniscus element convex toward the long conjugate, a weak meniscus element convex toward the short conjugate, and a strong negative unit positioned closely to the CRT and providing most of the field curvature correction of the lens system.

Each of the meniscus elements has at least one aspherical surface to facilitate the correction of the aberrations of the lens system. Because the lens surfaces are aspheric, the overall shapes of the elements are described in terms of best fit spherical surfaces, rather than the radii of curvature of the elements at the optical axis. See Dunham, C. B., and C. R. Crawford, "Minimax Approximation by a Semi-Circle," *Society for Industrial and Applied Mathematics*, Vol. 17, No. 1, February, 1980.

Thus, in the examples presented below, various of the meniscus elements have radii of curvature at the optical axis corresponding to biconvex or biconcave lenses, rather than a meniscus lens (see, in particular, the fifth elements in Examples 1 and 3 (biconvex) and the fourth element in Example 2 (biconcave)). The best fit spherical radii for these elements, however, are those of a meniscus, and thus they are described herein as meniscus elements.

To maintain a relatively low cost of the lens system, all the aspherical meniscus elements are designed to be manufactured in optical plastic. In particular, for ease of molding, a fairly uniform thickness is maintained across the aperture of each of these elements. Because they are plastic, it is desirable to keep the power of the meniscus elements relatively low so as to minimize shifts in focus of the lens system with changes in ambient temperature. The power element (element 3) is preferably made out of glass.

Figure 1:
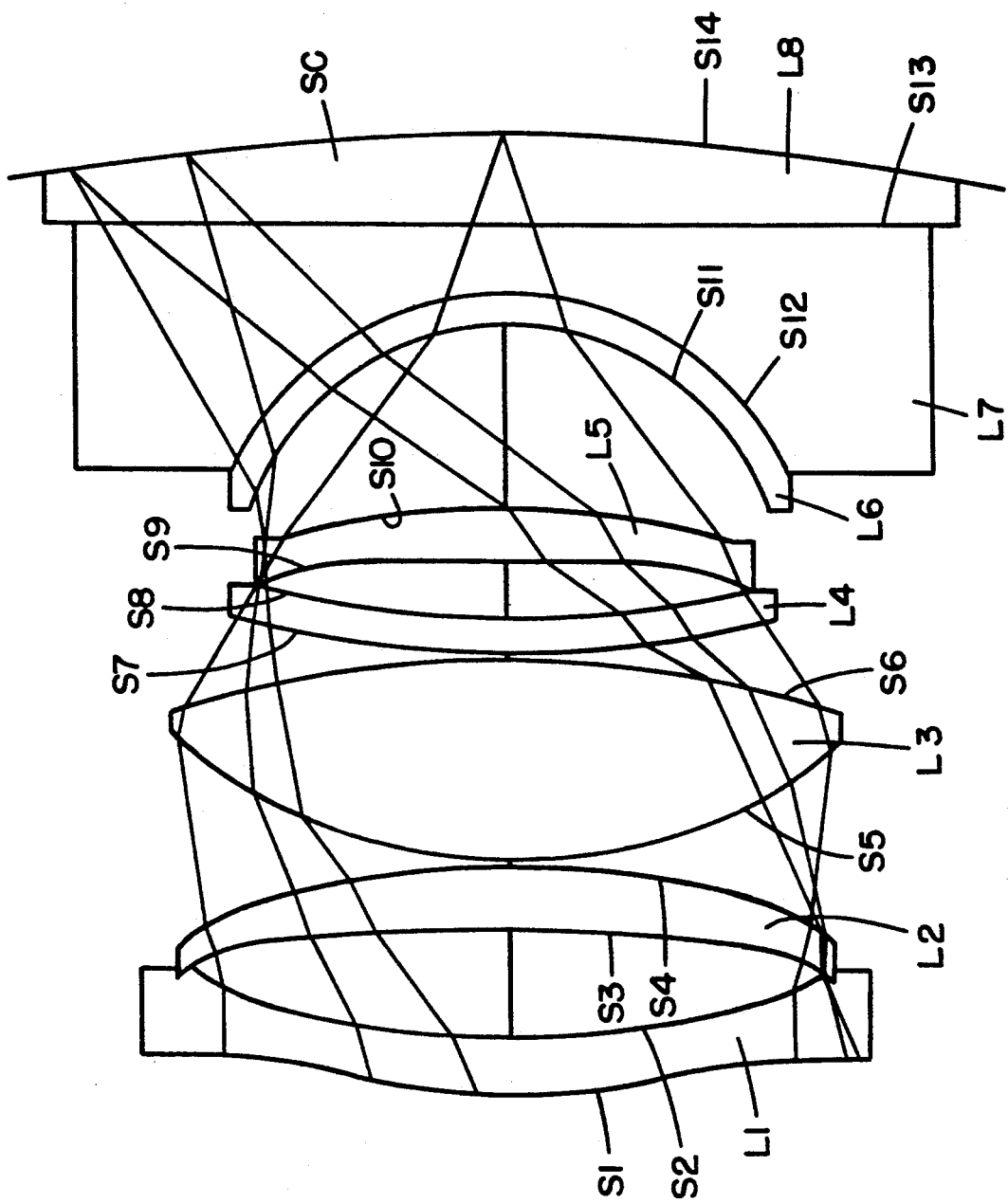
FIGS. 1 through 3 are schematic side views of lens systems constructed in accordance with the invention.
Figure 2:
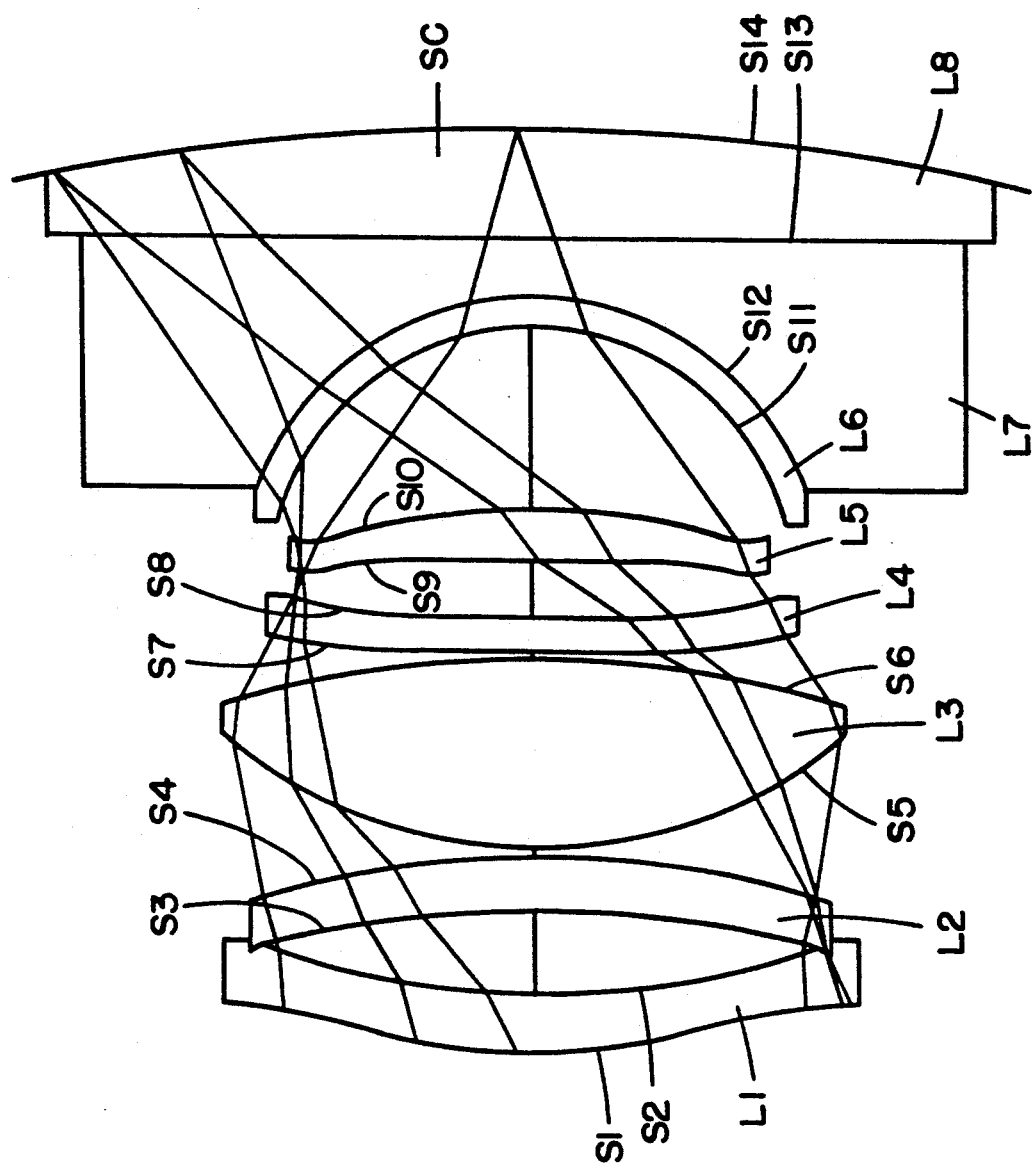
Figure 3:
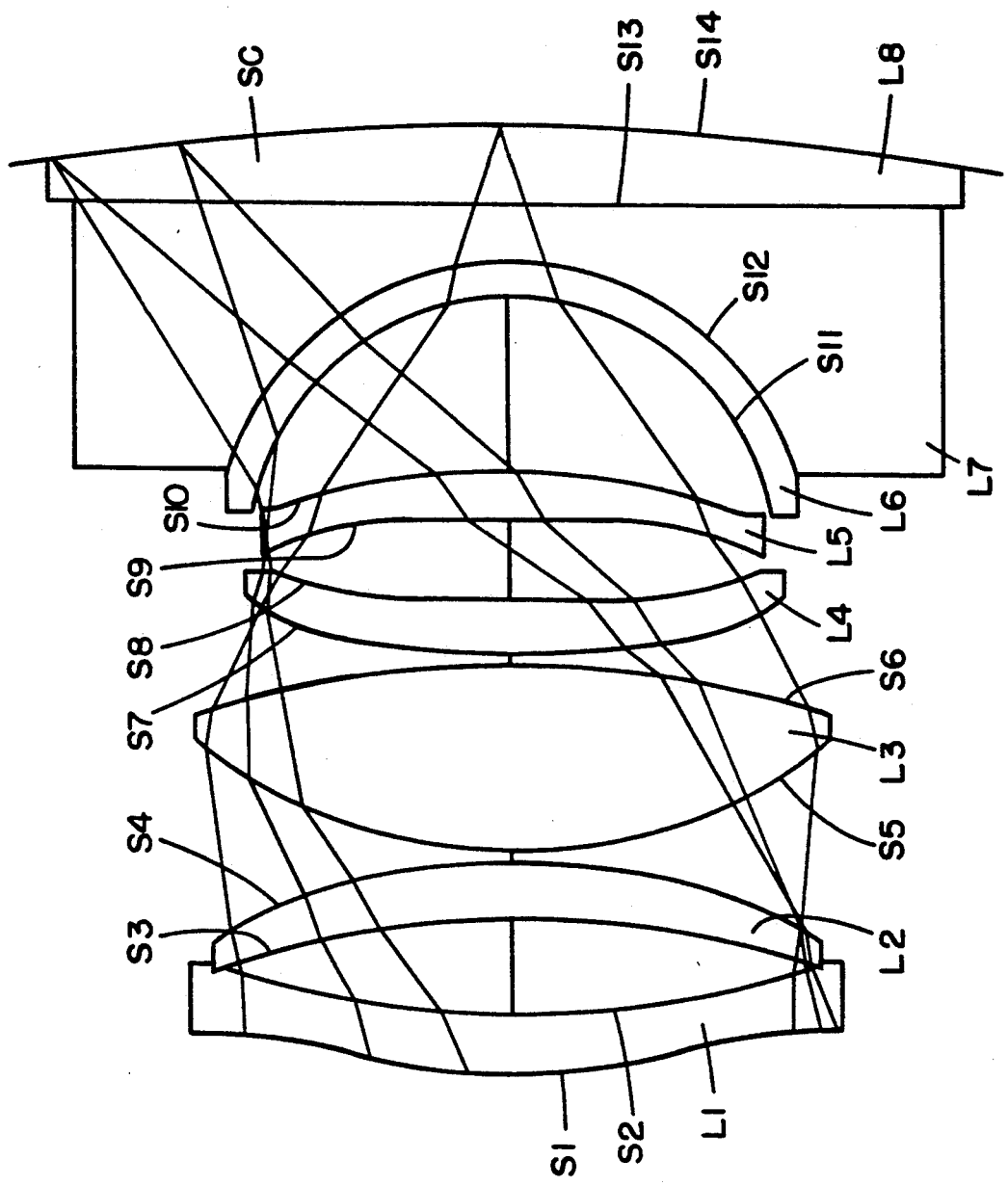

FIGS. 1 to 3 illustrate various lens systems constructed in accordance with the invention. Corresponding prescriptions appear in Tables 1 to 3, respectively. A summary of various properties of these systems appears in Table 4. In these figures and tables, the letter "L" is used to designate individual lenses, the letter "S" to designate lens surfaces, and the letters "SC" to designate the screen of the cathode ray tube.

The $N_e$ and $V_e$ values given in Tables 1-3 represent the indices of refraction and Abbe values for the various lenses at a wavelength of 0.5461 microns. The aspheric coefficients set forth in the tables are for use in the following equation:

$$z = \frac{cy^2}{1 + [1 - (1 + k)c^2y^2]^{\frac{1}{2}}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which for the lenses of Tables 1-3 is zero.

Each of the lens systems of FIGS. 1-3 has two meniscus elements on each side of a strong positive element. The concave surfaces of the menisci for each pair face opposite conjugates, i.e., each pair of menisci includes one concave surface facing the lens system's long conjugate and one facing its short conjugate. In practice, this arrangement has been found to allow for excellent correction of residual off-axis aperture dependent aberrations.

As can also be seen in the figures, the strong negative unit which corrects for field curvature includes lens element $L_6$ and the space between that element and the face of the CRT tube which, during use, is normally filled with a cooling liquid having an index of refraction of about 1.44. In the tables, this space has been identified as $L_7$ and the focal length of the combination of $L_6$ and $L_7$ is identified by $f_{6/7}$.

As can be seen from Table 4, all of the examples have a half field of view of about 37.5° or more, and a f-number of 0.98 or less. Also, for each of the examples, the magnitudes of $f_1$, $f_2$, $f_4$, and $f_5$ are all at least 2.0 times $f_0$, and the magnitudes of $f_3$ and $f_{6/7}$ are less than 1.5 times $f_0$. In general, $f_3/f_0$ should be between 0.9 and 1.5 for lens systems of this type, and $-f_{6/7}/f_0$ should be between 0.8 and 1.6. For a CRT tube having a concave inner surface of the type shown in the figures, $f_5$ is normally positive as shown in Table 4.

Figure 4:
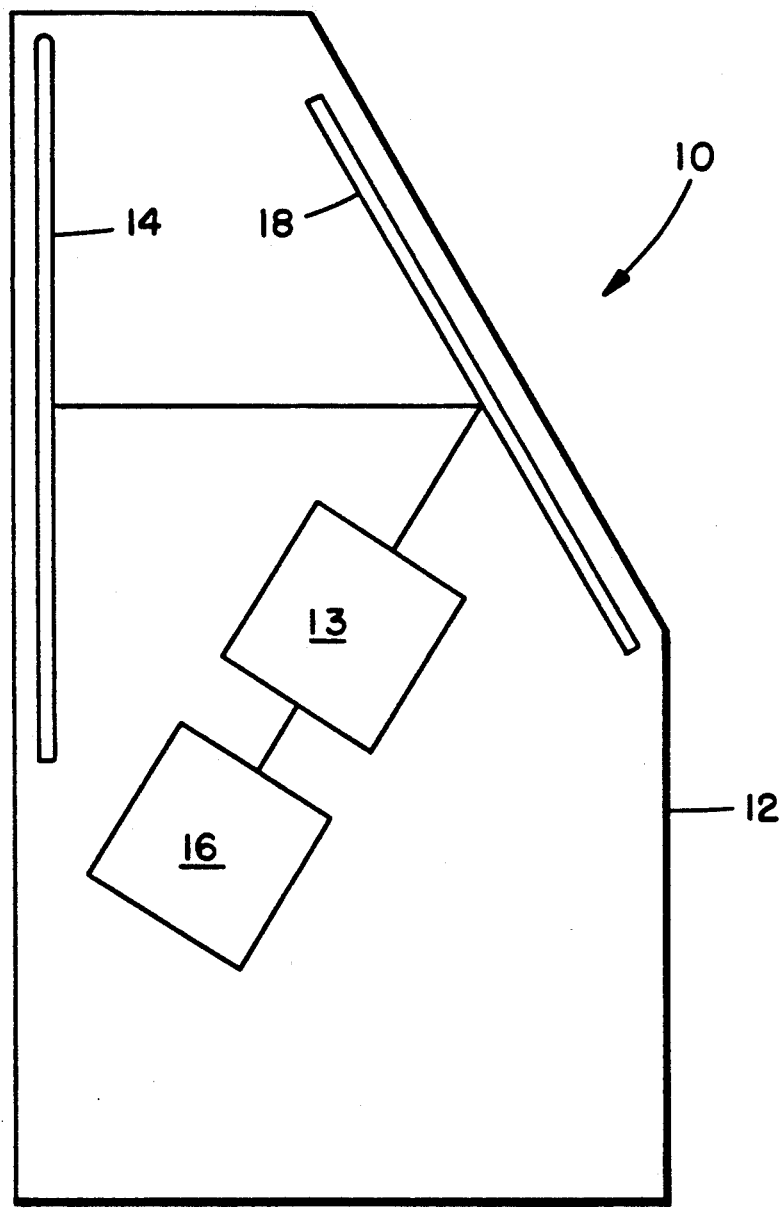
FIG. 4 is a schematic diagram of a projection TV employing a lens system constructed in accordance with the invention.

FIG. 4 is a schematic diagram of a CRT projection television 10 constructed in accordance with the invention. As shown in this figure, projection television 10 includes cabinet 12 having projection screen 14 along its front face and slanted mirror 18 along its back face. Preferably, the projection screen has a maximum numerical aperture of about 0.65, corresponding to a half angle field of view of the projection lens system of approximately 40°, e.g., about 40.5°.

Module 13 in FIG. 4 schematically illustrates a lens system constructed in accordance with the invention and module 16 illustrates its associated CRT tube. In practice, three lens systems 13 and three CRT tubes 16 are used to project red, green, and blue images onto screen 14. When constructed in accordance with the invention, lens system 13 allows for the use of substantially the full numerical aperture of screen 14 and thus permits cabinet 12 to be reduced in size without sacrificing the quality of the image seen by the viewer.

Although specific embodiments of the invention have been described and illustrated, it is to be understood that a variety of modifications which do not depart from the scope and spirit of the invention will be evident to persons of ordinary skill in the art from the foregoing disclosure. The following claims are intended to cover the specific embodiments set forth herein as well as such modifications, variations, and equivalents.

TABLE 1

| LENS | | SURFACE RADIUS (mm) | AXIAL DISTANCE BETWEEN SURFACES (mm) | Ne | Ve |
|---|---|---|---|---|---|
| | S1 | 87.7951 | | | |
| L1 | | | 8.00000 | 1.49354 | 57.34 |
| | S2 | 168.2725 | | | |
| | | | 15.09215 | | |
| | S3 | −157.3325 | | | |

TABLE 1-continued

| | | | | | |
|---|---|---|---|---|---|
| L2 | | | 9.00000 | 1.49354 | 57.34 |
| | S4 | −117.4165 | | | |
| | | | 1.00000 | | |
| | S5 | 80.2943 | | | |
| L3 | | | 28.00000 | 1.64128 | 55.20 |
| | S6 | −158.5687 | | | |
| | | | 1.00000 | | |
| | S7 | 472.2124 | | | |
| L4 | | | 5.00000 | 1.49354 | 57.34 |
| | S8 | 124.9835 | | | |
| | | | 7.93515 | | |
| | S9 | 12630.6299 | | | |
| L5 | | | 8.00000 | 1.49354 | 57.34 |
| | S10 | −115.8354 | | | |
| | | | 25.07228 | | |
| | S11 | −46.2755 | | | |
| L6 | | | 4.00000 | 1.49354 | 57.34 |
| | S12 | −45.0000 | | | |
| L7 | | | 10.00000 | 1.43300 | 50.00 |
| | S13 | ∞ | | | |
| L8 | | | 13.00000 | 1.56000 | 50.00 |
| | S14 | −350.0000 | | | |

| ASPHERICAL SURFACE DATA: | | | | | | |
|---|---|---|---|---|---|---|
| S | D | E | F | G | H | I |
| S1 | −1.0773E-06 | −4.8121E-10 | 5.9208E-14 | 2.1144E-17 | 1.4723E-21 | −4.3679E-25 |
| S2 | −1.0861E-07 | 3.7350E-10 | −6.2577E-13 | 8.0409E-16 | −4.1164E-19 | 7.6817E-23 |
| S3 | 1.3182E-06 | 6.1627E-11 | −1.0535E-13 | −4.3847E-17 | −1.3007E-20 | −3.4893E-24 |
| S4 | 1.1142E-06 | −4.4386E-10 | 6.7432E-14 | −3.2528E-17 | −2.0555E-20 | 2.5439E-24 |
| S7 | 1.0338E-06 | −2.0472E-10 | 4.4943E-14 | 1.5481E-16 | 7.4959E-20 | −5.2320E-23 |
| S8 | 4.8285E-07 | 7.7793E-12 | −8.2828E-13 | 5.0910E-16 | 2.1783E-19 | −2.9646E-22 |
| S9 | −1.8051E-07 | −4.0326E-09 | 7.9917E-12 | −1.0790E-14 | 7.0376E-18 | −1.6617E-21 |
| S10 | −9.8972E-08 | 1.1325E-09 | −4.1976E-12 | 6.4670E-15 | −4.7219E-18 | 1.5976E-21 |
| S11 | −5.6916E-06 | 1.2933E-08 | −2.4494E-11 | 2.5200E-14 | −1.3291E-17 | 2.6766E-21 |

TABLE 2

| LENS | | SURFACE RADIUS (mm) | AXIAL DISTANCE BETWEEN SURFACES (mm) | Ne | Ve |
|---|---|---|---|---|---|
| | S1 | 82.1238 | | | |
| L1 | | | 8.00000 | 1.49354 | 57.34 |
| | S2 | 150.1071 | | | |
| | | | 11.73334 | | |
| | S3 | −120.5126 | | | |
| L2 | | | 8.00000 | 1.49354 | 57.34 |
| | S4 | −117.3231 | | | |
| | | | 1.00000 | | |
| | S5 | 69.0000 | | | |
| L3 | | | 27.00000 | 1.59142 | 61.03 |
| | S6 | −145.4355 | | | |
| | | | 1.00000 | | |
| | S7 | −637.2584 | | | |
| L4 | | | 4.50000 | 1.49354 | 57.34 |
| | S8 | 512.7397 | | | |
| | | | 8.21973 | | |
| | S9 | −1560.8311 | | | |
| L5 | | | 7.00000 | 1.49354 | 57.34 |
| | S10 | −104.4605 | | | |
| | | | 25.28039 | | |
| | S11 | −41.8838 | | | |
| L6 | | | 4.00000 | 1.49354 | 57.34 |
| | S12 | −42.7000 | | | |
| L7 | | | 9.00000 | 1.44300 | 50.00 |
| | S13 | ∞ | | | |
| L8 | | | 14.60000 | 1.56600 | 50.00 |
| | S14 | −350.0000 | | | |

| ASPHERICAL SURFACE DATA: | | | | | | |
|---|---|---|---|---|---|---|
| S | D | E | F | G | H | I |
| S1 | −1.1857E-06 | −5.9949E-10 | 7.3505E-14 | 2.8521E-17 | 3.7614E-21 | 2.3315E-24 |
| S2 | −2.1070E-07 | 4.0899E-10 | −6.8147E-13 | 1.0930E-15 | −6.9553E-19 | 1.6389E-22 |
| S3 | 1.5162E-06 | 3.8946E-11 | −2.4176E-13 | −1.7906E-17 | −5.2558E-21 | −3.1562E-25 |
| S4 | 1.2987E-06 | −5.2083E-10 | 4.8170E-14 | −3.6589E-17 | −6.7738E-21 | 8.8584E-24 |
| S7 | 1.5559E-06 | 3.0835E-10 | −3.9575E-13 | 3.3409E-16 | 1.7969E-19 | −2.0574E-22 |
| S8 | 1.0035E-06 | 3.6892E-10 | −3.4405E-13 | 8.6351E-17 | 1.9554E-19 | 1.8083E-22 |
| S9 | −7.2694E-07 | −4.3263E-09 | 1.0695E-11 | −1.5654E-14 | 1.1131E-17 | −2.5901E-21 |
| S10 | −5.2954E-07 | 1.3193E-09 | −4.7572E-12 | 8.8568E-15 | −7.8968E-18 | 3.2523E-21 |
| S11 | −6.3610E-06 | 1.5988E-08 | −3.1292E-11 | 3.2600E-14 | −1.7221E-17 | 3.3709E-21 |

TABLE 3

| LENS | | SURFACE RADIUS (mm) | AXIAL DISTANCE BETWEEN SURFACES (mm) | Ne | Ve |
|---|---|---|---|---|---|
| L1 | S1 | 114.5811 | | | |
| | | | 11.00000 | 1.49354 | 57.34 |
| | S2 | 216.1410 | | | |
| | | | 18.62874 | | |
| | S3 | −127.9231 | | | |
| L2 | | | 11.00000 | 1.49354 | 57.34 |
| | S4 | −111.5452 | | | |
| | | | 1.40000 | | |
| | S5 | 101.1084 | | | |
| L3 | | | 38.00000 | 1.51872 | 64.02 |
| | S6 | −200.8468 | | | |
| | | | 1.40000 | | |
| | S7 | 497.9165 | | | |
| L4 | | | 10.00000 | 1.49354 | 57.34 |
| | S8 | 348.3251 | | | |
| | | | 15.91195 | | |
| | S9 | 1705.8051 | | | |
| L5 | | | 9.00000 | 1.49354 | 57.34 |
| | S10 | −221.4292 | | | |
| | | | 34.12141 | | |
| | S11 | −53.6088 | | | |
| L6 | | | 5.60000 | 1.49354 | 57.34 |
| | S12 | −60.6000 | | | |
| L7 | | | 12.00000 | 1.44000 | 50.00 |
| | S13 | ∞ | | | |
| L8 | | | 15.80000 | 1.55500 | 50.00 |
| | S14 | −550.0000 | | | |

ASPHERICAL SURFACE DATA:

| S | D | E | F | G | H | I |
|---|---|---|---|---|---|---|
| S1 | −3.5682E-07 | −1.4353E-10 | 7.9509E-15 | 3.7989E-19 | −3.3331E-23 | 6.1176E-26 |
| S2 | 6.5468E-09 | −2.6508E-11 | −2.5955E-14 | 3.3883E-17 | −9.1851E-21 | 7.6830E-25 |
| S3 | 4.8064E-07 | 3.9252E-11 | −1.5559E-14 | 5.9662E-18 | −1.0104E-21 | −2.8993E-25 |
| S4 | 5.0340E-07 | −4.4114E-11 | −1.7961E-16 | −1.5354E-18 | 5.2656E-23 | −1.0394E-25 |
| S7 | 6.2718E-07 | −3.5534E-13 | −4.8748E-16 | 1.4588E-17 | −2.0099E-21 | 3.2207E-25 |
| S8 | 2.7040E-07 | −7.3215E-12 | −4.1730E-15 | 1.0813E-18 | 1.0246E-20 | −3.4198E-24 |
| S9 | −3.3688E-07 | −8.1073E-10 | 5.6792E-13 | −4.2055E-16 | 1.4221E-19 | −1.4154E-23 |
| S10 | −1.9123E-07 | 4.5521E-12 | −3.7323E-13 | 2.5629E-16 | −9.3801E-20 | 1.8322E-23 |
| S11 | −1.2889E-06 | 1.7888E-09 | −1.6741E-12 | 9.0379E-16 | −2.4907E-19 | 2.7852E-23 |

TABLE 4

| | Example 1 | Example 2 | Example 3 |
|---|---|---|---|
| $f_0$ | 77.96 | 74.81 | 107.10 |
| $f_1$ | 360.12 | 353.66 | 477.02 |
| $f_2$ | 872.71 | 4911.30 | 1444.70 |
| $f_3$ | 87.11 | 83.01 | 135.47 |
| $f_4$ | −346.04 | −574.95 | −2402.20 |
| $f_5$ | 232.62 | 226.48 | 397.72 |
| $f_6$ | 1624.50 | 7167.90 | −1280.50 |
| $f_7$ | −103.93 | −96.39 | −137.73 |
| $f_{6/7}$ | −107.74 | −94.67 | −120.59 |
| Mag. | −0.0826 | −0.1073 | −0.1043 |
| f/No.* | 0.947 | 0.98 | 0.975 |
| ‡ Field of View | 38.1° | 39.93° | 37.55° |

*For object at infinity.

What is claimed is:

1. A projection lens system for use with a cathode ray tube comprising in order from the image side a first weak meniscus aspherical element which is convex to the image, a second weak meniscus aspherical element which is concave to the image, a strong positive element which provides a majority of the power of the lens, a third weak aspherical meniscus element which is convex to the image, a fourth weak aspherical meniscus element which is concave to the image and a strong negative unit which is associated with the cathode ray tube during use of the lens system and which provides most of the correction for the field curvature of the lens system.

2. The projection lens system of claim 1 wherein the lens system has a half angle field of view in the direction of the image of about 40 degrees.

3. The projection lens system of claim 1 wherein the f-number of the lens system is about 1.0 or less.

4. The projection lens system of claim 2 wherein the f-number of the lens system is about 1.0 or less.

5. The projection lens system of claim 1 in combination with a projection screen wherein the field of view of the lens system in the direction of the image substantially matches the maximum numerical aperture of the projection screen.

6. The projection lens system of claim 5 wherein the maximum numerical aperture of the projection screen is about 0.65.

7. The projection lens system of claim 6 wherein the f-number of the lens system is about 1.0 or less.

8. The projection lens system of claim 1 wherein the fourth weak aspherical meniscus element is positive.

9. A projection television set comprising a cathode ray tube, a screen, and a projection lens system for projecting light from the cathode ray tube onto the screen to form an image, said projection lens system having a long conjugate in the direction of the screen and a short conjugate in the direction of the cathode ray tube, said projection lens system comprising from the long conjugate a first weak meniscus aspherical element which is convex to the long conjugate, a second weak meniscus aspherical element which is concave to the long conjugate, a strong positive element which provides a majority of the power of the lens, a third weak aspherical meniscus element which is convex to the long conjugate, a fourth weak aspherical meniscus element which is concave to the long conjugate and a strong negative unit which is associated with the cathode ray tube and provides most of the correction for the field curvature of the lens system.

10. The projection television set of claim 9 wherein the field of view of the projection lens system in the direction of the long conjugate substantially matches the maximum numerical aperture of the projection screen.

11. The projection television set of claim 10 wherein the maximum numerical aperture of the projection screen is about 0.65.

12. The projection television set of claim 11 wherein the projection lens system has a f-number of about 1.0 or less.

13. The projection television set of claim 9 wherein the face of the cathode ray tube has an inner surface which is concave to the projection lens system and the fourth weak aspherical meniscus element of the projection lens system is positive.

14. The projection television set of claim 9 comprising two additional cathode ray tubes and two additional projection lens systems, one associated with each of the additional cathode ray tubes, each additional projection lens system having the same components and structure as the projection lens system of claim 9.

* * * * *